(12) United States Patent
Tsukizaki et al.

(10) Patent No.: US 10,295,052 B2
(45) Date of Patent: May 21, 2019

(54) VEHICLE SHIFT CONTROL DEVICE

(71) Applicant: Nissan Motor Co., Ltd., Yokohama-shi, Kanagawa (JP)

(72) Inventors: Atsushi Tsukizaki, Kanagawa (JP); Masato Koga, Kanagawa (JP); Hiroyuki Fukuda, Kanagawa (JP); Ryohey Toyota, Kanagawa (JP); Hidekazu Yagi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/575,860

(22) PCT Filed: Jun. 22, 2015

(86) PCT No.: PCT/JP2015/067894
§ 371 (c)(1),
(2) Date: Nov. 21, 2017

(87) PCT Pub. No.: WO2016/207953
PCT Pub. Date: Dec. 29, 2016

(65) Prior Publication Data
US 2018/0172143 A1    Jun. 21, 2018

(51) Int. Cl.
*F16H 61/12*    (2010.01)
*F01M 1/02*    (2006.01)
(Continued)

(52) U.S. Cl.
CPC .............. *F16H 61/12* (2013.01); *B60W 20/50* (2013.01); *F01M 1/02* (2013.01); *B60K 6/442* (2013.01); *B60K 6/547* (2013.01); *B60W 10/06* (2013.01); *B60W 10/08* (2013.01); *B60W 10/10* (2013.01); *B60W 10/11* (2013.01); *B60W 10/26* (2013.01);
(Continued)

(58) Field of Classification Search
None
See application file for complete search history.

(56) References Cited

U.S. PATENT DOCUMENTS 4,903,551 A * 2/1990 Hiramatsu .......... F16H 61/0206
477/131
6,139,459 A * 10/2000 Suzuki ................ F16H 61/0206
475/123
(Continued)

FOREIGN PATENT DOCUMENTS

CN    102712314 A    10/2012
CN    103161590 A    6/2013
(Continued)

*Primary Examiner* — Justin Holmes
(74) *Attorney, Agent, or Firm* — Global IP Counselors, LLP

(57) ABSTRACT

A vehicle transmission control device is provided in a vehicle having a gear type transmission capable of selecting a plurality of gear shift patterns, and an electric oil pump for supplying lubricating oil to a gear-shifting mechanism. The vehicle transmission control device includes a transmission controller that selects a path having a small load on the lubricated parts from among the plurality of power transmission paths upon detecting a malfunction has occurred in the oil pump to prevent seizing of lubricated parts and damage to gear-shifting mechanism if a malfunction occurs in the oil pump.

6 Claims, 12 Drawing Sheets

(51) Int. Cl.
*B60W 20/50* (2016.01)
*B60K 6/442* (2007.10)
*B60W 10/10* (2012.01)
*B60W 10/11* (2012.01)
*B60W 20/40* (2016.01)
*F16H 59/40* (2006.01)
*F16H 59/72* (2006.01)
*F16H 57/04* (2010.01)
*F16H 59/36* (2006.01)
*F16H 61/04* (2006.01)
*B60K 6/547* (2007.10)
*B60W 10/06* (2006.01)
*B60W 10/08* (2006.01)
*B60W 10/26* (2006.01)
*B60W 30/19* (2012.01)

(52) U.S. Cl.
CPC ............ *B60W 20/40* (2013.01); *B60W 30/19* (2013.01); *F16H 57/043* (2013.01); *F16H 57/045* (2013.01); *F16H 57/0457* (2013.01); *F16H 57/0471* (2013.01); *F16H 57/0494* (2013.01); *F16H 59/40* (2013.01); *F16H 59/72* (2013.01); *F16H 2059/366* (2013.01); *F16H 2059/725* (2013.01); *F16H 2061/0422* (2013.01); *F16H 2061/1232* (2013.01); *F16H 2061/1264* (2013.01); *F16H 2200/0021* (2013.01); *F16H 2200/0052* (2013.01); *F16H 2200/2038* (2013.01); *F16H 2200/2064* (2013.01); *Y02T 10/6221* (2013.01); *Y02T 10/6234* (2013.01)

(56) References Cited

U.S. PATENT DOCUMENTS

| | | | |
|---|---|---|---|
| 2002/0148310 A1* | 10/2002 | Uchino | F16H 61/12 74/335 |
| 2003/0196503 A1 | 10/2003 | Kobayashi | |
| 2003/0197385 A1* | 10/2003 | Onoyama | F02D 41/0215 290/40 R |
| 2005/0124457 A1* | 6/2005 | Nakamori | B60K 6/365 477/3 |
| 2007/0117678 A1* | 5/2007 | Fukushima | F16H 61/12 477/119 |
| 2008/0188348 A1 | 8/2008 | Kumazaki et al. | |

FOREIGN PATENT DOCUMENTS

| | | |
|---|---|---|
| CN | 103963628 A | 8/2014 |
| JP | 4-285358 A | 10/1992 |
| JP | 2000-55184 A | 2/2000 |
| JP | 2013-119881 A | 6/2013 |
| JP | 2014-20451 A | 2/2014 |
| JP | 2014-144666 A | 8/2014 |

* cited by examiner

GEAR SHIFT PATTERN

|  |  | C1 | | |
|---|---|---|---|---|
| C2 | C3 | Left | N | Right |
| N | N | EV –<br>ICEgen | Neutral | EV –<br>ICE 3rd |
|  | Left | EV 1st<br>ICE 1st | EV 1st<br>ICE – | EV 1st<br>ICE 3rd |
|  |  | Lock | EV 1st<br>ICE 2nd | Lock |
| Left | N | EV 1.5<br>ICE 2nd | EV –<br>ICE 2nd | Lock |
|  | Right | Lock | EV 2nd<br>ICE 2nd | Lock |
| N | | EV 2nd<br>ICE 3rd' | EV 2nd<br>ICE – | EV 2nd<br>ICE 3rd |
|  |  | Lock | EV 2nd<br>ICE 4th | Lock |
| Right | N | EV 2.5<br>ICE 4th | EV –<br>ICE 4th | Lock |
|  | Left | Lock | EV 1st<br>ICE 4th | Lock |

FIG. 4

VEHICLE SHIFT CONTROL DEVICE

CROSS-REFERENCE TO RELATED APPLICATIONS

This application is a U.S. National stage application of International Application No. PCT/JP2015/067894, filed Jun. 22, 2015.

BACKGROUND

Field of the Invention

The present invention relates to a vehicle transmission control device comprising an oil pump that supplies lubrication oil to a gear-shifting mechanism.

Background Information

An example of a vehicle transmission control device comprising an oil pump that supplies lubrication oil to a transmission mechanism is a technique disclosed in Japanese Laid Open Patent Application No. 4-285358 (Patent Document 1). In the technique disclosed in Patent Document 1, an electric oil pump that supplies lubrication oil to a lubricated parts of a gear type shifting mechanism is provided, and the discharge amount of the electric oil pump is controlled in accordance with the operating state of the vehicle. By employing such a configuration, the technique disclosed in Patent Document 1 improves the design flexibility of the transmission, and prevents seizing of lubricated parts and damage thereto.

SUMMARY

However upon detecting a malfunction has occurred in the oil pump that supplies lubrication oil, if an ordinary shift control is continued, there is a risk that seizing of the lubricated parts and damage thereto will occur due to poor lubrication.

In view of the problems described above, an object of the present invention is to provide a vehicle transmission control device in a vehicle provided with an oil pump for supplying lubricating oil to a gear-shifting mechanism, which is configured to be able to prevent seizing of lubricated parts and damage thereto, if a malfunction occurs in the oil pump.

In order to achieve the object described above, a vehicle of the present invention comprises a transmission having a gear-shifting mechanism that obtains a plurality of gear shift stages by selecting a plurality of power transmission paths, and an oil pump that supplies lubrication oil to lubricated parts of the gear-shifting mechanism. In addition, the transmission control device of the present invention is provided with a transmission controller for selecting a plurality of power transmission paths. The transmission controller selects a path having a small load on the lubricated parts from among a plurality of power transmission paths upon detecting a malfunction has occurred in the oil pump.

Therefore upon detecting a malfunction has occurred in the oil pump, a power transmission path having a small load on the lubricated parts is selected. That is, in a normal shift control based on a gear shift request, there are cases in which a power transmission path having a large load on the lubricated part is selected. Consequently, if such a shift control is maintained when a malfunction occurs in the oil pump, there is a risk that seizing and damage will occur in the lubricated parts. In contrast, in the present invention, a power transmission path having a small load on the lubricated parts is selected upon detecting a malfunction has occurred in the oil pump. As a result, it is possible to prevent seizing and damage in the lubricated parts, even if a malfunction occurs in the lubricating oil pump.

BRIEF DESCRIPTION OF THE DRAWINGS

Referring now to the drawings, a vehicle is illustrated that is provided with a drive system and a vehicle transmission control device.

FIG. 4 is a gear shift pattern view illustrating the gear shift patterns according to the switching positions of three engagement clutches in a transmission mounted on a vehicle to which is applied the transmission control device of the embodiment.

DETAILED DESCRIPTION OF THE EMBODIMENTS

Figure 1:
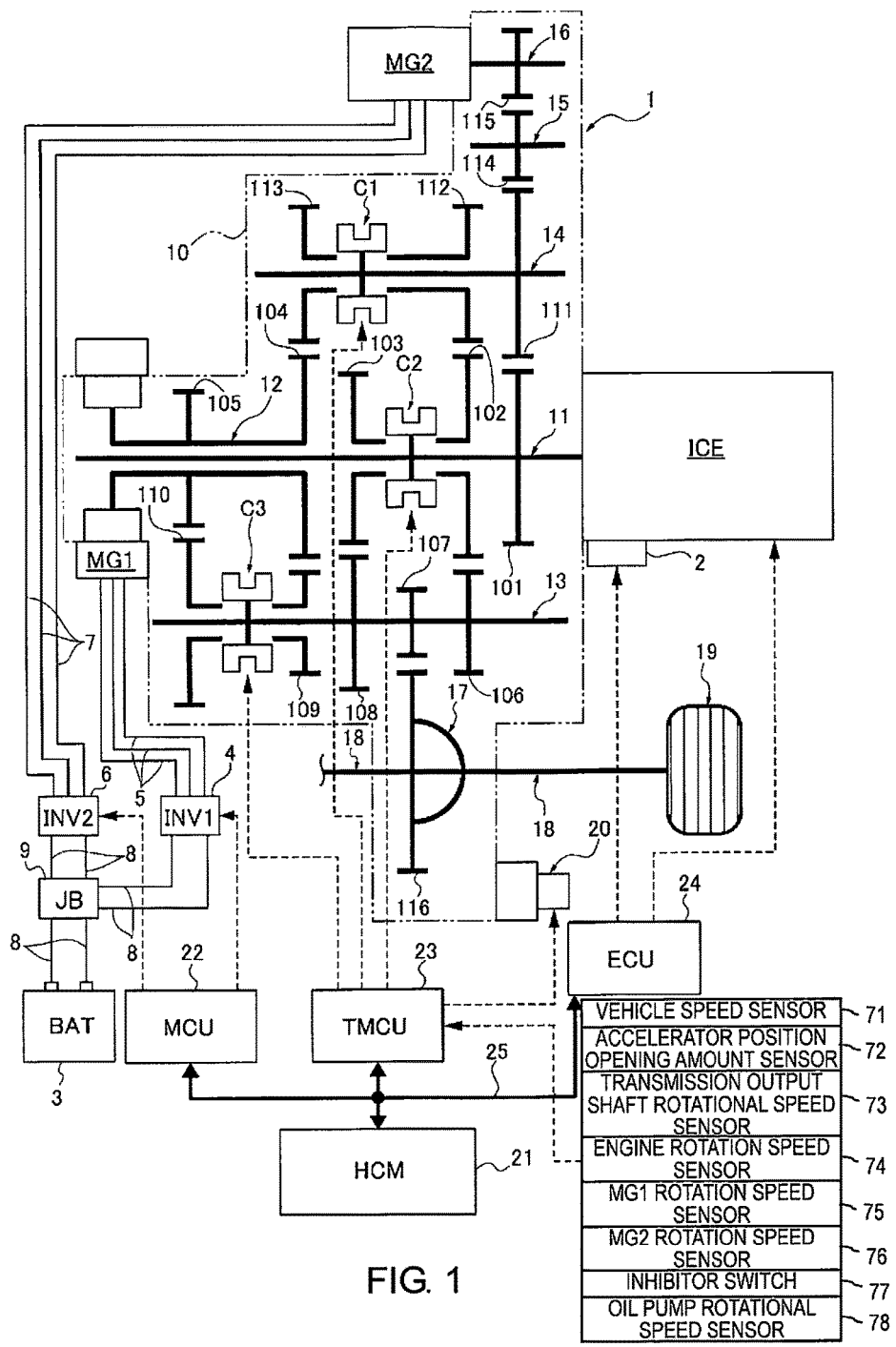
FIG. 1 is an overall system view illustrating a drive system and a control system of a vehicle to which is applied the transmission control device of the embodiment.

A preferred embodiment for realizing the vehicle transmission control device of the present invention is described below based on the embodiment illustrated in the drawings.

EXAMPLES

The configuration is described first. The transmission control device of the embodiment is applied to a hybrid vehicle (one example of an electrically driven vehicle), comprising, as drive system components, one engine, two motor/generators, and a multistage gear transmission having three engagement clutches. The "overall system configuration," the "configuration of the transmission," the "configuration of the gear shift patterns," and the "configuration of the shift control process" will be separately described below, regarding the configuration of the transmission control device for a hybrid vehicle in the embodiment.

Overall System Configuration

FIG. 1 illustrates a drive system and a control system of a vehicle (hybrid vehicle) to which is applied the transmission control device of the embodiment. The overall system configuration will be described below, based on FIG. 1.

The drive system of the hybrid vehicle comprises an internal combustion engine ICE, a first motor/generator MG1, a second motor/generator MG2, and a multistage gear transmission 1 having three engagement clutches C1, C2,// C3//, as illustrated in FIG. 1. "ICE" is an acronym for "Internal Combustion Engine."

The internal combustion engine ICE is, for example, a gasoline engine or a diesel engine that is disposed in a front room of a vehicle such that the crankshaft direction is in the vehicle width direction. This internal combustion engine ICE is connected to a transmission case 10 of the multistage gear transmission 1, and the output shaft of the internal combustion engine is connected to a first shaft 11 (first gear shaft) of the multistage gear transmission 1. The internal combustion engine ICE basically carries out an MG2 start, where the second motor/generator MG2 is used as a starter motor. However, a starter motor 2 is left in preparation for when an MG2 start using a high-power battery 3 cannot be ensured, such as during extreme cold.

Both the first motor/generator MG1 and the second motor/generator MG2 are permanent magnet type synchronous motors utilizing a three-phase alternating current, having the high-power battery 3 as a common power source. The stator of the first motor/generator MG1 is fixed to a case of the first motor/generator MG1, and the case is fixed to the transmission case 10 of the multistage gear transmission 1. Then, a first motor shaft integrated to a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated to a rotor of the second motor/generator MG2 is connected to a sixth shaft 16 of the multistage gear transmission 1. A first inverter 4, which converts direct current to three-phase alternating current during powering and converts three-phase alternating current to direct current during regeneration, is connected to a stator coil of the first motor/generator MG1, via a first AC harness 5. A second inverter 6, which converts direct current to three-phase alternating current during powering and converts three-phase alternating current to direct current during regeneration, is connected to a stator coil of the second motor/generator MG2, via a second AC harness 7. The high-power battery 3, the first inverter 4, and the second inverter 6 are connected by a DC harness 8, via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided as engagement clutches. The transmission case 10 is provided with an electric oil pump (oil pump) 20 that supplies lubrication oil to the meshing portions of the gears and the bearing portions (bearing) inside the case.

The first shaft 11 is a shaft to which the internal combustion engine ICE is connected, and a first gear 101, a second gear 102 (first power transmission gear), and a third gear 103 are disposed on the first shaft 11, in order from the right side in FIG. 1. The first gear 101 is integrally provided (including integral fixing) to the first shaft 11. The second gear 102 and the third gear 103 are idling gears, in which a boss portion that protrudes in the axial direction is inserted onto the outer perimeter of the first shaft 11, and are provided so as to be drivably connectable to the first shaft 11 via the second engagement clutch C2.

The second shaft 12 (second gear shaft) is a shaft to which the first motor/generator MG1 is connected, and is a hollow cylindrical shaft coaxially disposed with the axis aligned with the outer side position of the first shaft 11, and a fourth gear 104 (fourth power transmission gear) and a fifth gear 105 (fourth power transmission gear) are disposed on the second shaft 12, in order from the right side in FIG. 1. The fourth gear 104 and the fifth gear 105 are integrally provided (including integral fixing) to the second shaft 12.

The third shaft 13 is a shaft disposed on the output side of the multistage gear transmission 1, and a sixth gear 106 (third power transmission gear), a seventh gear 107, an eighth gear 108, a ninth gear 109 (sixth power transmission gear), and a tenth gear 110 (sixth power transmission gear) are disposed on the third shaft 13, in order from the right side in FIG. 1. The sixth gear 106, the seventh gear 107, and the eighth gear 108 are integrally provided (including integral fixing) to the third shaft 13. The ninth gear 109 and the tenth gear 110 are idling gears, in which boss portions protruding in the axial direction are inserted onto the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 has both ends supported on the transmission case 10, with an eleventh gear 111, a twelfth gear 112 (second power transmission gear), and a thirteenth gear 113 (fifth power transmission gear) are disposed on the fourth shaft 14, in order from the right side in FIG. 1. The eleventh gear 111 is integrally provided (including integral fixing) to the fourth shaft 14. The twelfth gear 112 and the thirteenth gear 113 are idling gears, in which a boss portion protruding in the axial direction is inserted onto the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12.

The fifth shaft 15 has both ends are supported on the transmission case 10, and a fourteenth gear 114 that meshes with the eleventh gear 111 of the fourth shaft 14 is integrally provided thereto (including integral fixing).

The sixth shaft 16 is connected to the second motor/generator MG2, and a fifteenth gear 115 that meshes with the fourteenth gear 114 of the fifth shaft 15 is integrally provided thereto (including integral fixing).

The second motor/generator MG2 and the internal combustion engine ICE are mechanically connected to each other by a gear train configured from the fifteenth gear 115, the fourteenth gear 114, the eleventh gear 111, and the first gear 101, which mesh with each other. This gear train serves as a reduction gear train that decelerates the MG2 rotational speed at the time of an MG2 start of the internal combustion engine ICE by the second motor/generator MG2, and serves as a speed increasing gear train that accelerates the engine rotational speed at the time of MG2 power generation for generating the second motor/generator MG2, by the driving of the internal combustion engine ICE.

The first engagement clutch C1 is a dog clutch interposed between the twelfth gear 112 and the thirteenth gear 113 of the fourth shaft 14, and that is engaged by an engagement movement in a rotation synchronization state by not having a synchronization mechanism. When the first engagement clutch C1 is in a left engagement position (Left), the fourth shaft 14 and the thirteenth gear 113 are drivingly connected. When the first engagement clutch C1 is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 is a dog clutch interposed between the second gear 102 and the third gear 103 of the first shaft 11, and that is engaged by an engagement movement in a rotation synchronization state by not having a synchronization mechanism. When the second engagement clutch C2 is in a left engagement position (Left), the first shaft 11 and the third gear 103 are drivingly connected. When the second engagement clutch C2 is in a neutral position (N), the first shaft 11 and the second gear 102 are released, and the first shaft 11 and the third gear 103 are released. When the second engagement clutch C2 is in a right engagement position (Right), the first shaft 11 and the second gear 102 are drivingly connected.

The third engagement clutch C3 is a dog clutch interposed between the ninth gear 109 and the tenth gear 110 of the third shaft 13, and that is engaged by an engagement movement in a rotation synchronization state by not having a synchronization mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivingly connected. Then, a sixteenth gear 116 that meshes with the seventh gear 107 integrally provided (including integral fixing) to the third shaft 13 of the multistage gear transmission 1 is connected to left and right drive wheels 19 via the differential gear 17 and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (acronym: "HCM") is an integrated control means to appropriately manage the energy consumption of the entire vehicle. This hybrid control module 21 is connected to the other control units (motor control unit 22, transmission control unit 23, engine control unit 24, etc.) so as to be capable of bidirectional information exchange by a CAN communication line 25. The "CAN" in CAN communication line 25 is an acronym for "Controller Area Network."

The motor control unit 22 (acronym: "MCU") carries out powering control, regeneration control, and the like, of the first motor/generator MG1 and the second motor/generator MG2, by control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target drive force is determined. In the "rotational speed FB control," a control is carried out in which a target motor rotational speed, with which the input/output rotational speeds of the clutch are synchronized, is determined, and an FB torque is output so as to converge the actual motor rotational speed to the target motor rotational speed, when there is a gear shift request to mesh and engage any one of the engagement clutches C1, C2, C3 during traveling.

The transmission control unit 23 (acronym "TMCU") carries out a shift control for switching the gear shift pattern (power transmission path) of the multistage gear transmission 1, by outputting a current command to electric actuators 31, 32, 33 (not shown) of the first, second, and third engagement clutches C1, C2, C3, based on predetermined input information. In this shift control, the engagement clutches C1, C2, C3 are selectively mesh engaged/released, and a gear pair involved in power transmission is selected from the plurality of pairs of gear pairs. Here, at the time of a gear shift request to engage any one of the released engagement clutches C1, C2, C3, in order to suppress differential rotational speed between the input/output of the clutch to ensure meshing engagement, a rotational speed FB control (rotation synchronization control) of the first motor/generator MG1 or the second motor/generator MG2 is used in combination.

The transmission control unit 23 inputs sensor signals and switch signals from a vehicle speed sensor 71, an accelerator position opening amount sensor 72, a transmission output shaft rotational speed sensor 73, an engine rotational speed sensor 74, an MG1 rotational speed sensor 75, an MG2 rotational speed sensor 76, an inhibitor switch 77, an oil pump rotational speed sensor 78, and the like. The transmission output shaft rotational speed sensor 73 is provided to the shaft end portion of the third shaft 13 and detects the shaft rotational speed of the third shaft 13. The transmission control unit 23 determines whether or not a malfunction has occurred in the electric oil pump 20, based on a sensor signal of the oil pump rotational speed sensor 78. The determination of whether or not a malfunction has occurred in the electric oil pump 20 is not limited to an oil pump rotational speed sensor 78, and, for example, may be determined by providing a hydraulic pressure sensor to the electric oil pump 20, by providing a temperature sensor to the lubricated parts described later, or by a combination thereof. That is, if a malfunction occurs in the electric oil pump 20, the discharge pressure of the electric oil pump 20 decreases while the temperature of the lubricated parts increases; it is thereby also possible to determine a malfunction in the electric oil pump 20 based on these changes.

The engine control unit 24 (acronym "ECU") carries out start control of the internal combustion engine ICE, stop control of the internal combustion engine ICE, fuel cut control, and the like, by outputting a control command to the motor control unit 22, a spark plug, a fuel injection actuator, or the like, based on predetermined input information.

The multistage gear transmission 1 according to the embodiment is characterized in that efficiency is obtained by reducing drag by employing, as shifting elements, engagement clutches C1, C2, C3 (dog clutch) that are meshingly engaged. Then, when there is a gear shift request to mesh and engage any one of the engagement clutches C1, C2, C3, the differential rotational speeds of the input/output of the clutch are synchronized by the first motor/generator MG1 (when the engagement clutch C3 is engaged) or the second motor/generator MG2 (when the engagement clutches C1, C2 are engaged), and an engagement movement is started once the rotational speed falls within a synchronization determination rotational speed range, to realize the gear shift. In addition, when there is a gear shift request to release any one of the engaged engagement clutches C1, C2, C3, the clutch transmission torque of the release clutch is reduced, and a disengagement movement is started once the torque becomes equal to or less than a release torque determination value, to realize the gear shift.

Configuration of the Transmission

Figure 2:
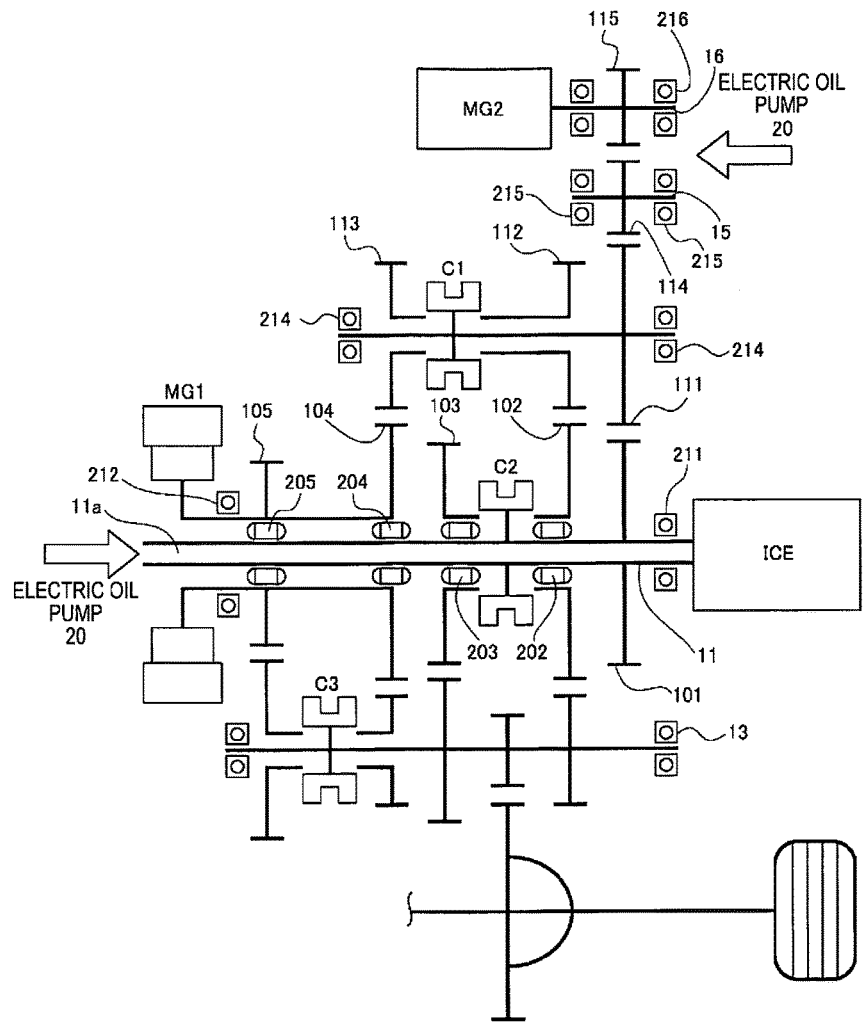
FIG. 2 is a schematic overview illustrating the configuration of a transmission mounted on a vehicle to which is applied the transmission control device of the embodiment.

FIG. 2 is a cross-sectional view of the multistage gear transmission 1 of the embodiment. The configuration of the transmission 1 of the embodiment will be described below, based on FIG. 2.

In the multistage gear transmission 1 of the embodiment, the second gear 102 and the third gear 103 are disposed on the outer perimeter side of the first shaft 11, which is connected to the output shaft of the internal combustion engine ICE, via a second bearing portion 202 and a third bearing portion 203, respectively, as illustrated in FIG. 2. The first shaft 11 is supported to the transmission case 10 by the eleventh bearing portion 211, and is supported inside the second shaft 12, which is a cylindrical shaft, by the fourth bearing portion 204 and the fifth bearing portion 205. Here, the fourth bearing portion 204 is interposed between the first shaft 11 and the fourth gear 104, which is integrally provided with the second shaft 12. In addition, the fifth bearing portion 205 is interposed between the first shaft 11 and the fifth gear 105, which is integrally provided with the second shaft 12. Additionally, the second shaft 12 is supported to the transmission case 10 by the twelfth bearing portion 212.

The fourth shaft 14 is supported to the transmission case 10 by the fourteenth bearing portion 214. The fifth shaft 15 is supported to the transmission case 10 by the fifteenth bearing portion 215. Additionally, the sixth shaft 16 is supported to the transmission case 10 by the sixteenth bearing portion 216.

The electric oil pump 20 supplies lubrication oil to the bearing portions and gears described above. Specifically, the discharge passage (not shown) of the electric oil pump 20 is connected to a lubrication oil passage 11a provided inside the first shaft 11, and the lubrication oil that is discharged from the electric oil pump 20 is supplied to each bearing portion (202, 203, 204, 205, and the like) and each gear (101-105, and the like) via the lubrication oil passage 11a of the first shaft 11.

In addition, the discharge passage (not shown) of the electric oil pump 20 is also connected to an oil chamber (not shown) provided in the vicinity of the sixth shaft 16, and the lubrication oil that is stored in the oil chamber is supplied to the fifteenth and sixteenth bearing portions 215, 216, and the like. The multistage gear transmission 1 comprises a plurality of bearing portions and gears in addition to the above, as illustrated in FIG. 2, but detailed descriptions of the other configurations are omitted. In addition, in the present Specification, rotating elements to which lubrication oil is supplied, such as the plurality of bearing portions (second and third bearing portions 202, 203, etc.) and the plurality of gears (first and second gears 101, 102, etc.) described above, are collectively referred to as "lubricated parts."

Configuration of the Gear Shift Pattern

The multistage gear transmission 1 of the first embodiment is characterized in that size reduction is obtained by reducing the power transmission loss by not having a differential rotation absorbing element, such as a fluid coupling, and by reducing ICE gear shift stages (gear shift stages of the internal combustion engine ICE) by providing motor assistance to the internal combustion engine ICE (EV gear shift stages: 1-2 speed, ICE gear shift stages: 1-4 speed). The configuration of the gear shift pattern of the multistage gear transmission 1 is described below based on FIG. 3 and FIG. 4.

Figure 3:
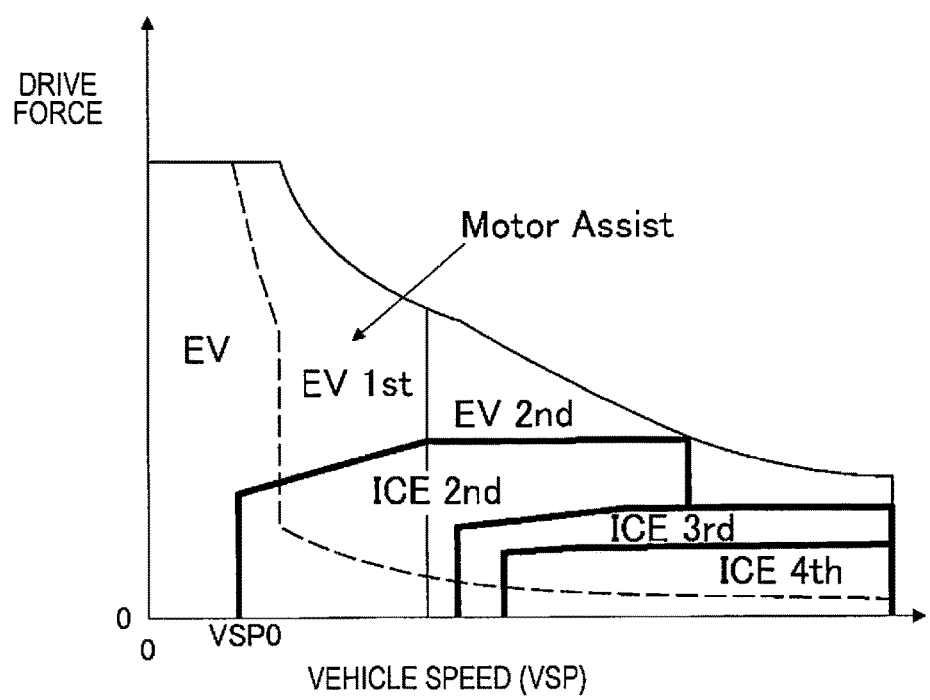
FIG. 3 is a schematic overview of a shifting map illustrating a concept of switching the gear shift pattern in a transmission mounted on a vehicle to which is applied the transmission control device of the embodiment.

A concept of a gear shift pattern is employed in which, when the vehicle speed VSP is in a starting region equal to or less than a predetermined vehicle speed VSP0, since the multistage gear transmission 1 does not have a differential rotation absorbing element, a motor start by only the motor driving force is carried out in the "EV mode" (more precisely, EV 1st, which is the first speed of the EV gear shift stage) as illustrated in FIG. 3. Then, when in the traveling region and the demand for driving force is great, a "parallel HEV mode" is employed in which the engine driving force is assisted by the motor driving force, as illustrated in FIG. 3. That is, as the vehicle speed VSP increases, the ICE gear shift stages shift from (ICE 1st)→ICE 2nd→ICE 3rd→ICE 4th, and the EV gear shift stages (gear shift stages of the first motor/generator MG1) shift from EV 1st→EV 2nd. Therefore, based on the concept of the gear shift pattern illustrated in FIG. 3, a shifting map for issuing gear shift requests for switching the gear shift pattern is created.

The gear shift patterns obtainable by the multistage gear transmission 1 having engagement clutches C1, C2, C3 are as shown in FIG. 4. In FIG. 4, "Lock" represents an interlock pattern that is not applicable as a gear shift pattern, "EV-" represents a state in which the first motor/generator MG1 is not drivingly connected to the driving wheels 19, and "ICE-" represents a state in which the internal combustion engine ICE is not drivingly connected to the driving wheels 19. In the shift control, it is not necessary to use all the gear shift patterns shown in FIG. 4, and it is of course possible to select from these gear shift patterns according to need. Each of the gear shift patterns is described below.

When the second engagement clutch C2 is in the "N" position and the third engagement clutch C3 is in the "N" position, the following gear shift patterns are obtained according to the position of the first engagement clutch C1. "EV-ICEgen" is obtained if the first engagement clutch C1 is in the "Left" position, "Neutral" is obtained if the first engagement clutch C1 is in the "N" position, and "EV-ICE3rd" is obtained if the first engagement clutch C1 is in the "Right" position. Here, the gear shift pattern "EV-ICEgen" is a pattern selected at the time of MG1 idle power generation, in which power is generated in the first motor/generator MG1 by the internal combustion engine ICE when the vehicle is stopped, or, at the time of double idle power generation in which MG2 power generation is carried out in addition to MG1 power generation. The gear shift pattern "Neutral" is a pattern selected at the time of MG2 idle power generation, in which power is generated in the second motor/generator MG2 by the internal combustion engine ICE when the vehicle is stopped.

When the second engagement clutch C2 is in the "N" position and the third engagement clutch C3 is in the "Left" position, the following gear shift patterns are obtained according to the position of the first engagement clutch C1. "EV1st ICE1st" is obtained if the first engagement clutch C1 is in the "Left" position, "EV1st ICE-" is obtained if the first engagement clutch C1 is in the "N" position, and "EV1st ICE3rd" is obtained if the first engagement clutch C1 is in the "Right" position. Here, the gear shift pattern "EV1st ICE-" is an "EV mode" pattern in which the internal combustion engine ICE is stopped and traveling is carried out by the first motor/generator MG1, or, a "series HEV mode" pattern in which a first-speed EV traveling is carried out by the first motor/generator MG1 while power is generated in the second motor/generator MG2 by the internal combustion engine ICE. For example, when traveling while selecting the "series HEV mode" by "EV1st ICE-," the first engagement clutch C1 is switched from the "N" position to the "Left" position, based on a deceleration due to insufficient driving force. In this case, the vehicle transitions to traveling by the "parallel HEV mode (first speed)" according to the "EV1st ICE1st" gear shift pattern, in which the driving force is secured.

When the second engagement clutch C2 is in the "Left" position and the third engagement clutch C3 is in the "Left" position, "EV1st ICE2nd" is obtained if the first engagement clutch C1 is in the "N" position. For example, if the driving force requirement is increased during first-speed EV traveling while selecting the "series HEV mode" by "EV 1st ICE-," the second engagement clutch C2 is switched from "N" to "Left." In this case, the vehicle transitions to traveling by a "parallel HEV mode" according to the "EV1st ICE2nd" gear shift pattern, in which the driving force is secured.

When the second engagement clutch C2 is in the "Left" position and the third engagement clutch C3 is in the "N" position, the following gear shift patterns are obtained according to the position of the first engagement clutch C1. "EV1.5 ICE2nd" is obtained if the first engagement clutch C1 is in the "Left" position, and "EV-ICE2nd" is obtained if the first engagement clutch C1 is in the "N" position.

When the second engagement clutch C2 is in the "Left" position and the third engagement clutch C3 is in the "Right" position, "EV2nd ICE2nd" is obtained if the first engagement clutch C1 is in the "N" position. For example, when traveling in the "parallel HEV mode" while selecting the "EV1st ICE2nd" gear shift pattern, the third engagement clutch C3 is switched from the "Left" position to the "Right" position via the "N" position, according to an upshift request. In this case, the vehicle transitions to traveling by the "parallel HEV mode" according to the "EV2nd ICE2nd" gear shift pattern, in which the EV gear shift stage is set to second speed. For example, when traveling in the "parallel HEV mode" while selecting the "EV2nd ICE4th" gear shift pattern, the second engagement clutch C2 is switched from the "Right" position to the "Left" position via the "N" position, according to a downshift request. In this case, the vehicle transitions to traveling by the "parallel HEV mode" according to the "EV2nd ICE2nd" gear shift pattern, in which the ICE gear shift stage is set to second speed.

When the second engagement clutch C2 is in the "N" position and the third engagement clutch C3 is in the "Right" position, the following gear shift patterns are obtained according to the position of the first engagement clutch C1. "EV2nd ICE3rd'" is obtained if the first engagement clutch C1 is "Left," "EV2nd ICE-" is obtained if the first engagement clutch C1 is "N," and "EV2nd ICE3rd" is obtained if the first engagement clutch C1 is "Right." Here, the gear shift pattern "EV2nd ICE-" is an "EV mode" pattern in which the internal combustion engine ICE is stopped and traveling is carried out by the first motor/generator MG1, or, a "series HEV mode" pattern in which a second-speed EV traveling is carried out by the first motor/generator MG1 while power is generated in the second motor/generator MG2 by the internal combustion engine ICE. For example, when traveling in the "parallel HEV mode" while selecting the "EV2nd ICE2nd" gear shift pattern, the second engagement clutch C2 is switched from the "Left" position to the "N" position, and the first engagement clutch C1 is switched from the "N" position to the "Right" position, according to an upshift request. In this case, the vehicle transitions to traveling by the "parallel HEV mode" according to the "EV2nd ICE3rd" gear shift pattern, in which the ICE gear shift stage is set to third speed.

When the second engagement clutch C2 is in the "Right" position and the third engagement clutch C3 is in the "Right" position, "EV2nd ICE4th" is obtained if the first engagement clutch Cl is in the "N" position.

When the second engagement clutch C2 is in the "Right" position and the third engagement clutch C3 is in the "N" position, the following gear shift patterns are obtained according to the position of the first engagement clutch C1. "EV2.5 ICE4th" is obtained if the first engagement clutch C1 is in the "Left" position, and "EV-ICE4th" is obtained if the first engagement clutch C1 is in the "N" position.

When the second engagement clutch C2 is in the "Right" position and the third engagement clutch C3 is in the "Left" position, "EV1st ICE4th" is obtained if the first engagement clutch C1 is in the "N" position.

Configuration of the Shift Control Process

Figure 5:
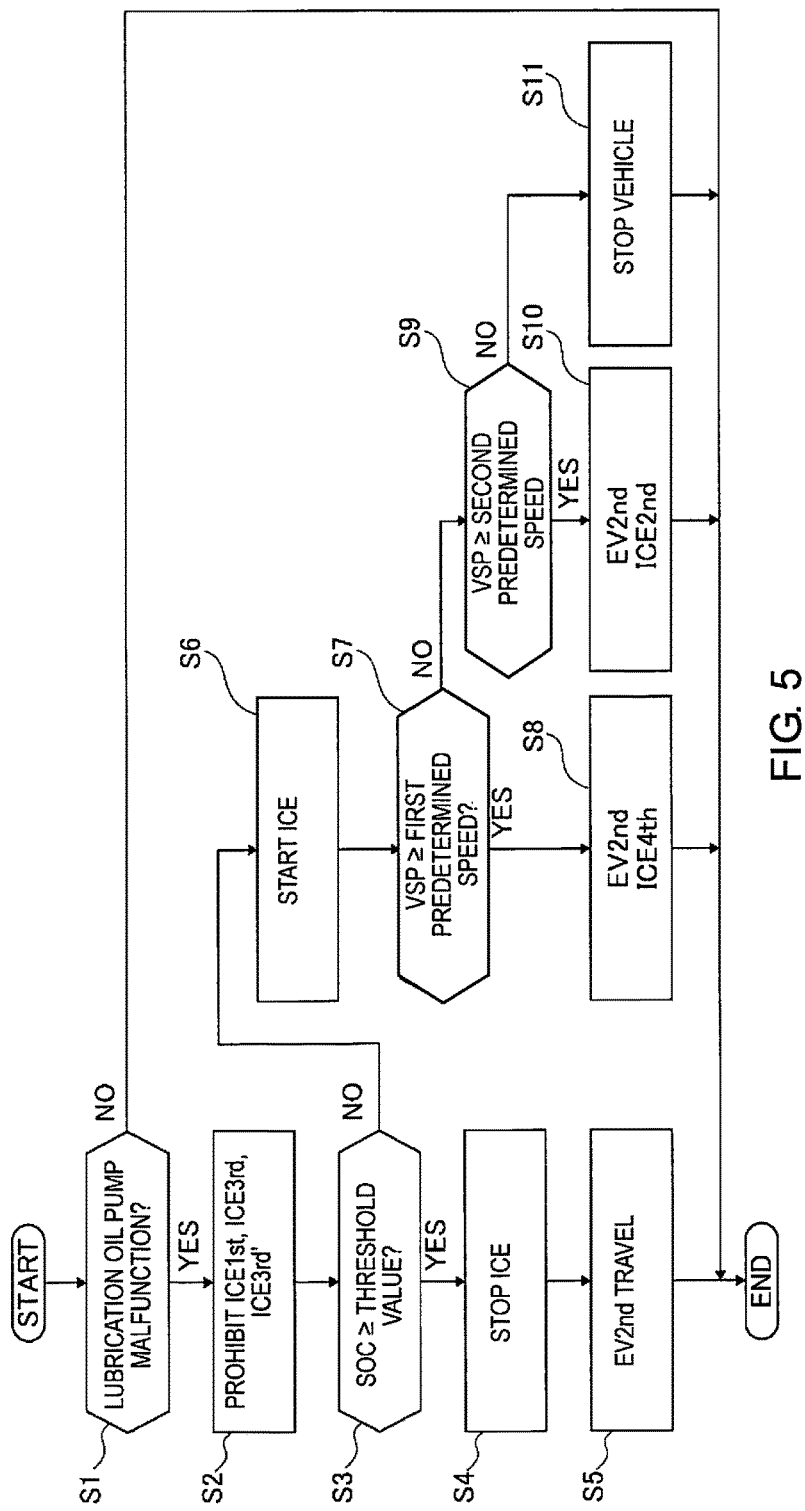
FIG. 5 is a flowchart illustrating the flow of a shift control process carried out in a transmission control unit of the embodiment.

FIG. 5 illustrates the flow of a shift control process carried out in the transmission control unit 23 (transmission controller) of the embodiment. The flowchart of FIG. 5 is repeatedly executed at predetermined time intervals.

First, in Step S1, the transmission control unit 23 determines whether or not a malfunction has occurred in the electric oil pump 20 for lubrication. In this embodiment, the determination of Step S1 is carried out based on an output of the oil pump rotational speed sensor 78. That is, if the rotational speed of the electric oil pump 20 detected by the oil pump rotational speed sensor 78 is low compared to a control command (target rotational speed) that is input to the electric oil pump 20, the transmission control unit 23 determines that a malfunction has occurred in the electric oil pump 20.

If the determination of Step S1 is NO (the electric oil pump 20 is normal), since it is sufficient to carry out the usual shift control, the following process is skipped. On the other hand, if the determination of Step S1 is YES (a malfunction has occurred in the electric oil pump 20), the process proceeds to Step S2, and the use of ICE1st, ICE3rd, and ICE3rd' as gear shift stages of the internal combustion engine ICE is prohibited.

Here, the reason for prohibiting the use of ICE1st and ICE3rd when a malfunction has occurred in the electric oil pump 20 will be described using FIGS. 6A-6B, FIG. 7, and FIGS. 8A and 8B.

Figure 6A:
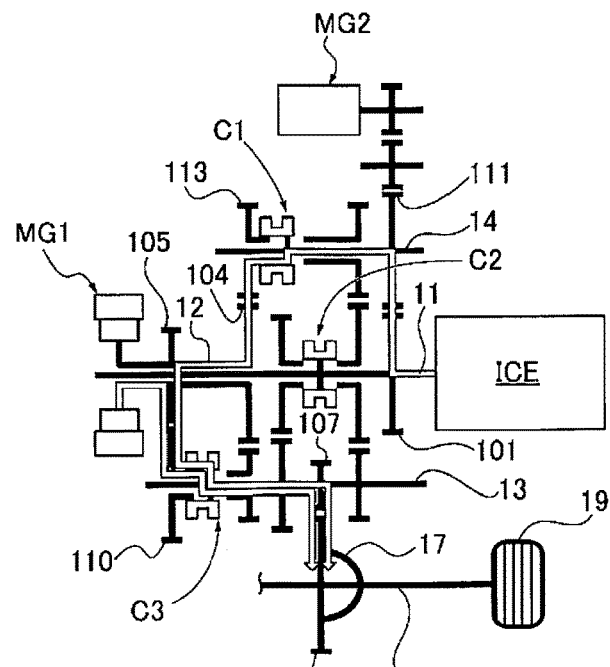
FIG. 6A is a torque flow view illustrating the flow of the MG1 torque and the ICE torque in a transmission when the "EV1st ICE1st" gear shift pattern is selected.
Figure 6B:
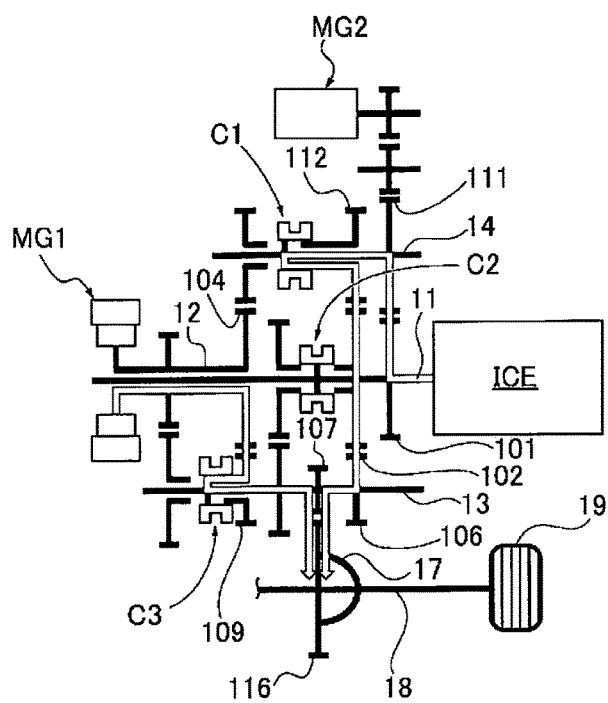
FIG. 6B is a torque flow view illustrating the flow of the MG1 torque and the ICE torque in a transmission when the "EV2nd ICE3rd" gear shift pattern is selected.

FIG. 6A illustrates the flow of the MG1 torque and the ICE torque when "EV1st ICE1st" is selected as a gear shift pattern of the parallel HEV mode, and FIG. 6B illustrates the flow of the MG1 torque and the ICE torque when "EV2nd ICE3rd" is selected.

When ICE1st is selected as the ICE gear shift stage, as illustrated in FIG. 6A, the ICE torque flows from the internal combustion engine ICE→first shaft 11→first gear 101→eleventh gear 111→fourth shaft 14→thirteenth gear 113→fourth gear 104→second shaft 12→fifth gear 105→tenth gear 110→third shaft 13→seventh gear 107→sixteenth gear 116→differential gear 17→drive shaft 18→drive wheels 19.

Additionally, when ICE3rd is selected as the ICE gear shift stage, as illustrated in FIG. 6B, the ICE torque flows from the internal combustion engine ICE→first shaft 11→first gear 101→eleventh gear 111→fourth shaft 14→twelfth gear 112→second gear 102→sixth gear 106→third shaft 13→seventh gear 107→sixteenth gear 116→differential gear 17→drive shaft 18→drive wheels 19.

Figure 7:
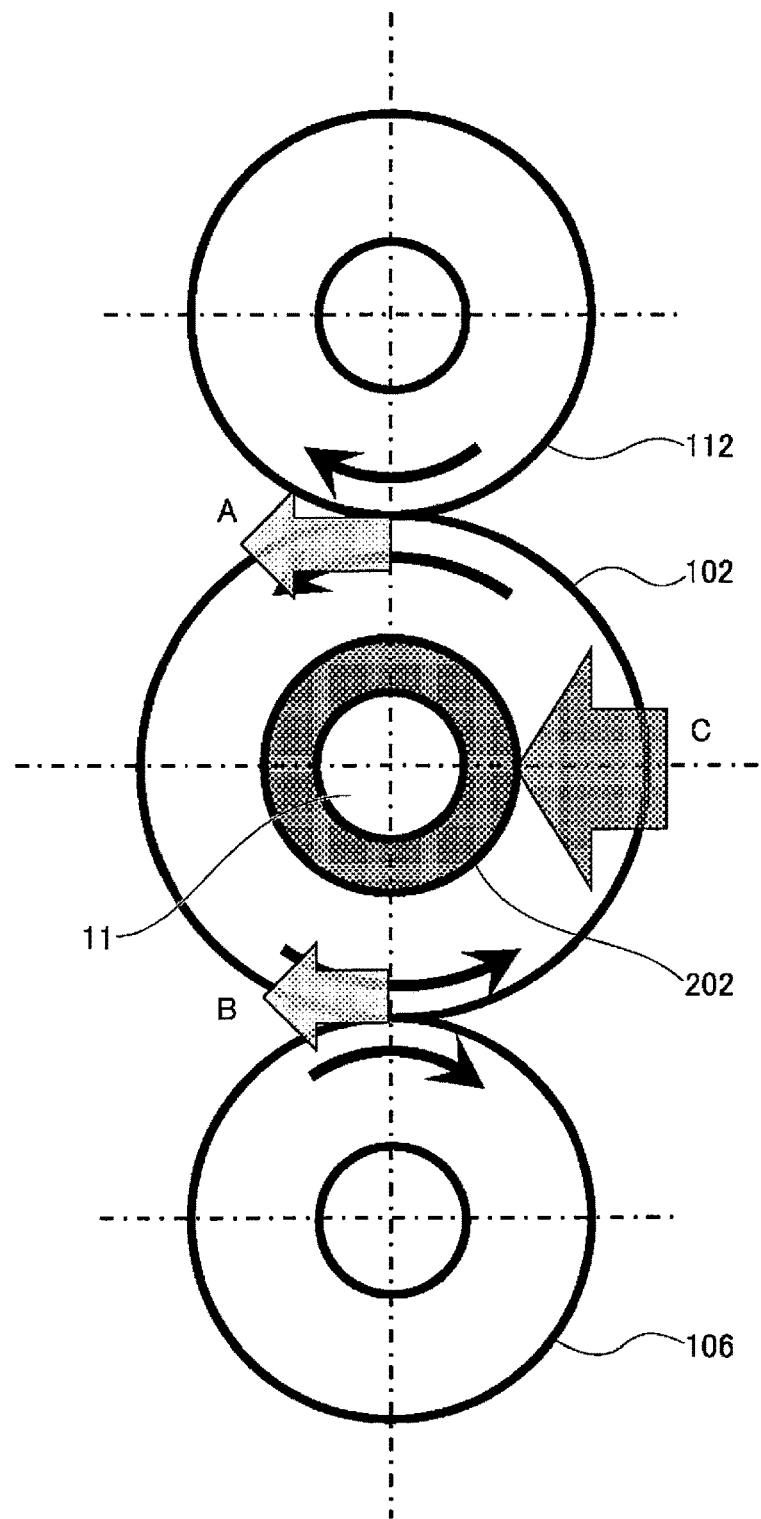
FIG. 7 is an explanatory view describing the force that is applied in the radial direction of the bearing portion, in a transmission mounted on a vehicle to which is applied the transmission control device of the embodiment.

That is, if ICE1st or ICE3rd is selected as the ICE gear shift stage, the ICE torque flows so as to straddle the first shaft 11. FIG. 7 is a conceptual view for describing the force (surface pressure) that is applied in the radial direction of the second bearing portion 202 provided to the first shaft 11, due to such a flow of the torque. FIG. 7 illustrates an example of a case in which "EV2nd ICE3rd" is selected (the case of FIG. 6B).

As described above, if ICE3rd is selected as the ICE gear shift stage, the ICE torque flows from the twelfth gear 112 (second power transmission gear)→second gear 102 (first power transmission gear)→sixth gear 106 (third power transmission gear). Then, when the ICE torque is transmitted from the twelfth gear 112 to the second gear 102, a force indicated by arrow A in FIG. 7 is generated. Then, when the ICE torque is transmitted from the second gear 102 to the sixth gear 106, a force (torque reaction force) indicated by arrow B in FIG. 7 is generated. As a result, surface pressure (force indicated by arrow A+force indicated by arrow B) represented by arrow C is applied in the radial direction of the second bearing portion 202, which is interposed between the first shaft 11 and the second gear 102.

Therefore, if ICE3rd is selected as the ICE gear shift stage, then the second bearing portion 202 receives a large surface pressure in the radial direction while being differentially rotated. Here, if the electric oil pump 20 is operating normally, sufficient lubrication oil is supplied to the second bearing portion 202, and it is possible to prevent seizing of the second bearing portion 202 and damage thereto. However, if a malfunction occurs in the electric oil pump 20 and sufficient lubrication oil cannot be supplied to the second bearing portion 202, then there is a risk that seizing or damage will occur in the second bearing portion 202.

In addition, as described above, if ICE1st is selected as the ICE gear shift stage, the ICE torque flows from the thirteenth gear 113 (fifth power transmission gear)→fourth gear 104 (fourth power transmission gear)→second shaft 12→fifth gear 105 (fourth power transmission gear)→tenth gear 110 (sixth power transmission gear). Then, as described with reference to FIG. 7, the fourth bearing portion 204 and the fifth bearing portion 205, which are interposed between the second shaft 12 and the first shaft 11, receive a large surface pressure in the radial direction while being differentially rotated. Therefore, if a malfunction occurs in the electric oil pump 20 in such a state, then there is a risk that seizing or damage will occur in the fourth bearing portion 204 and the fifth bearing portion 205.

While a detailed description will be omitted, the same applies to a case in which ICE3rd' is selected as the ICE gear shift stage. That is, if ICE3rd' is selected as the ICE gear shift stage, the fourth bearing portion 204 receives a large surface pressure in the radial direction while being differentially rotated. Therefore, if a malfunction occurs in the electric oil pump 20 in such a state, then there is a risk that seizing or damage will occur in the fifth bearing portion 205.

Figure 8A:
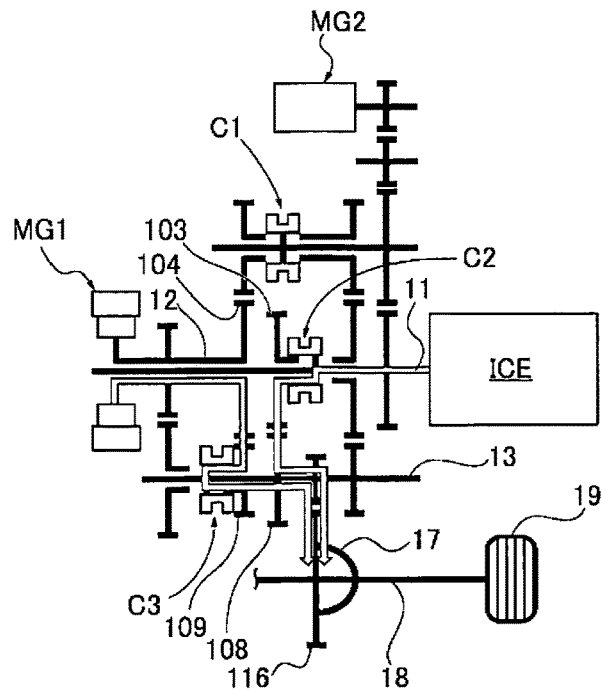
FIG. 8A is a torque flow view illustrating the flow of the MG1 torque and the ICE torque in a transmission when the "EV2nd ICE2nd" gear shift pattern is selected.
Figure 8B:
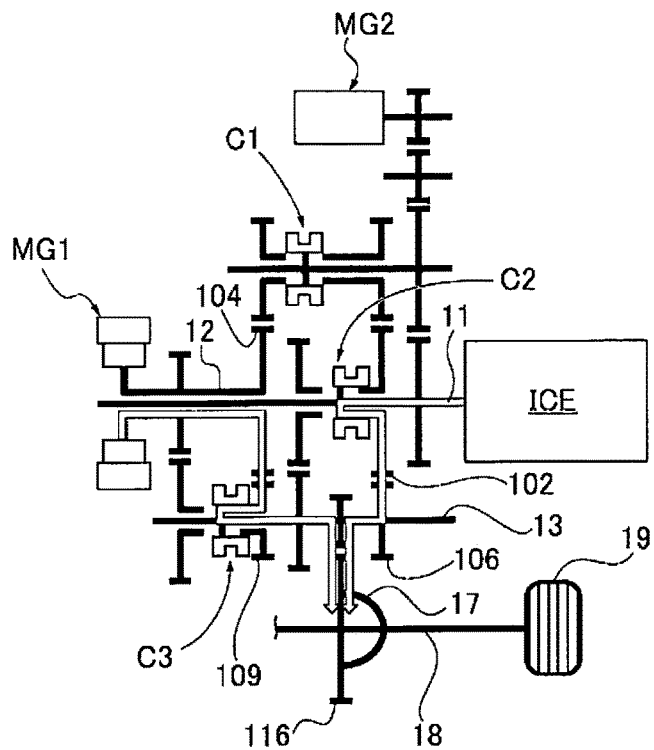
FIG. 8B is a torque flow view illustrating the flow of the MG1 torque and the ICE torque in a transmission when the "EV2nd ICE4th" gear shift pattern is selected.

In contrast, if ICE2nd or ICE4th is selected as the ICE gear shift stage, then the bearing portions (202, 204, 205) will not receive surface pressure such as the above, as illustrated in FIGS. 8A and 8B.

A specific description follows. FIG. 8A illustrates a case in which "EV2nd ICE2nd" is selected as the gear shift pattern, and FIG. 8B illustrates a case in which "EV2nd ICE4th" is selected as the gear shift pattern.

As is clear from FIGS. 8A and 8B, if ICE2nd or ICE4th is selected as the ICE gear shift stage, then the ICE torque will not flow across the first shaft 11. That is, while the second bearing portion 202, or the fourth and fifth bearing portions 204, 205, will be differentially rotated, since the ICE torque is not transmitted so as to straddle the first shaft 11, the bearing portions will only be rotated idly, and surface pressure will not be applied in the radial direction, as described with reference to FIG. 7.

In other words, if ICE2nd or ICE4th is used as the ICE gear shift stage, then it is possible to prevent the second bearing portion 202 and the fourth and fifth bearing portions 204, 205 from immediately seizing or being damaged, even if a malfunction occurs in the electric oil pump 20.

Therefore, in this embodiment, if a malfunction occurs in the electric oil pump 20, then the use of ICE1st and ICE3rd is prohibited. In this Specification, "differential rotation" means the differential rotation between a bearing portion, and a rotational shaft that is supported by the bearing portion.

To continue the description, returning to FIG. 5, the program next proceeds to Step S3, and it is determined whether or not the remaining battery SOC (State of Charge) of the high-power battery 3 is equal to or greater than a threshold value. The threshold value in Step S3 is set to a value with which it is possible to determine whether or not "EV mode," in which the internal combustion engine ICE is stopped and the vehicle travels only by the first motor/generator MG1, is possible.

If the determination of Step S3 is YES (remaining battery SOC of the high-power battery 3 is equal to or greater than the threshold value), that is, if it is determined that traveling by the "EV mode" is possible, then the process proceeds to Step S4, and the internal combustion engine ICE is stopped. Here, in the case where a malfunction has occurred in the electric oil pump 20, the reason why the "EV mode" is selected if the remaining battery SOC of the high-power battery 3 is equal to or greater than a threshold value will be described with reference to FIG. 9, etc.

Figure 9:
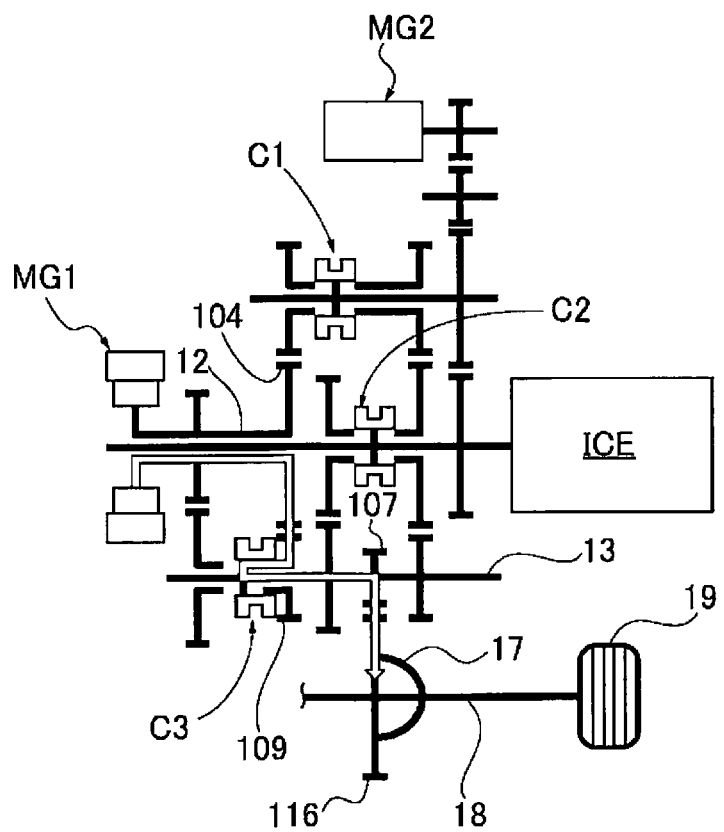
FIG. 9 is a torque flow view illustrating the flow of the MG1 torque in a transmission when the "EV2nd ICE-" gear shift pattern is selected.

FIG. 9 illustrates the flow of the MG1 torque when the "EV mode" (more specifically, the "EV2nd ICE-" gear shift pattern) is selected. As is clear from FIG. 9, in the "EV mode," since the internal combustion engine ICE is stopped, the rotary elements that are connected to the internal combustion engine ICE (specifically, the first shaft 11, the first gear 101, the eleventh gear 111, the fourth shaft 14, the fourteenth gear 114, the fifth shaft 15, the fifteenth gear 115, and the sixth shaft 16) are not rotated together with the internal combustion engine ICE. In addition, since the first engagement clutch C1 and the second engagement clutch C2 are released, the rotary elements described above also will not be rotated together with the first motor/generator MG1.

In other words, the eleventh bearing portion 211, which supports the first shaft 11 to the transmission case 10, the fourteenth bearing portion 214, which supports the fourth shaft 14 to the transmission case 10, the fifteenth bearing portion 215, which supports the fifth shaft 15 to the transmission case 10, and the sixteenth bearing portion 216, which supports the sixth shaft 16 to the transmission case 10, will not be differentially rotated. Therefore, when in the "EV mode," it is not necessary to supply lubrication oil to the above-described rotary elements and the bearing portions (eleventh, fourteenth, fifteenth, and sixteenth bearing portions 211, 214, 215, 216). In the present embodiment, the eleventh and fourteenth bearing portions 211, 214 are lubricated, not by lubrication oil that is supplied from the electric oil pump 20, but by lubrication oil that is scraped up from an oil pan (not shown) by the differential gear 17, or the like.

In contrast, in the "parallel HEV mode" illustrated in FIG. 6A, and the like, the above-described elements (first gear 101, eleventh gear 111, fourteenth gear 114, fifteenth gear 115) are rotated together with the internal combustion engine ICE. Therefore, in the "parallel HEV mode," it is necessary to supply lubrication oil in order to prevent seizing of the above-described rotary elements and bearing portions and damage thereto.

Therefore, in this embodiment, if a malfunction has occurred in the electric oil pump 20, and the remaining battery SOC of the high-power battery 3 is equal to or greater than a threshold value, the "EV mode" is selected, in which the number of bearing portions that are differentially rotated is small (that is, the load of the lubricated parts as a whole is small).

To continue the description, returning to FIG. 5, the process proceeds next to Step S5, EV2nd is selected as the EV gear shift stage (that is, the gear shift pattern of the multistage gear transmission 1 is set to "EV2nd ICE-"), and the program is ended.

Figure 10:
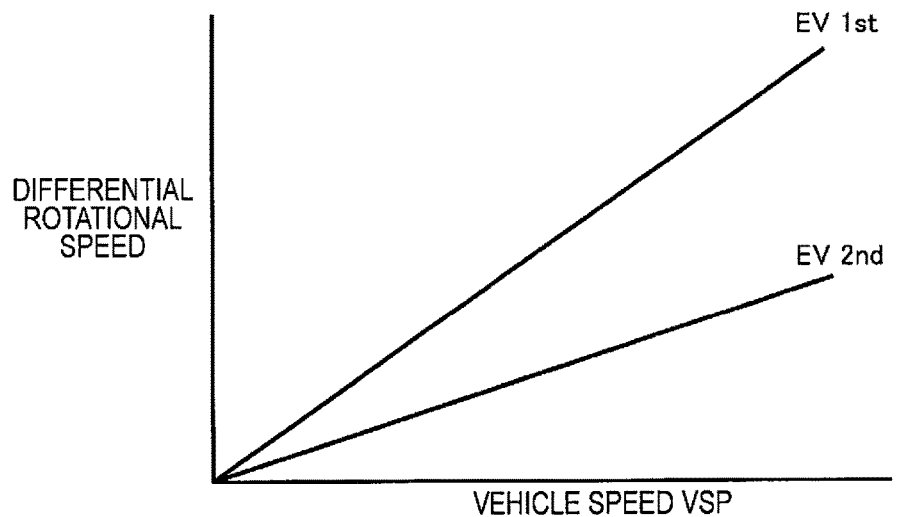
FIG. 10 is an explanatory view describing the relationship between the EV gear shift stage and the differential rotational speed of the bearing portion, in a transmission mounted on a vehicle to which is applied the transmission control device of the embodiment.

Here, the reason why EV2nd is selected as the EV gear shift stage will be described, with reference to FIG. 10. FIG. 10 illustrates the differential rotational speed of the fourth and fifth bearing portions 214, 215, when "EV mode" is selected in the multistage gear transmission 1 of the present embodiment.

As is clear from FIG. 10, the differential rotational speed of the fourth and fifth bearing portions 214, 215 in the "EV mode" becomes smaller when selecting EV2nd, compared to when selecting EV1st. A large differential rotational speed means that the required amount of lubrication oil is large. Therefore, it can be seen that the required amount of lubrication oil is smaller when selecting EV2nd (that is, the load of the lubricated parts as a whole is small).

Therefore, in this embodiment, if a malfunction occurs in the electric oil pump 20, then EV2nd is selected as the EV gear shift stage.

Returning to FIG. 5, the description will be continued. If the determination of Step S3 is NO (remaining battery SOC of the high-power battery 3 is less than the threshold value), the process proceeds to Step S6, and the internal combustion engine ICE is started (the operation is maintained if the internal combustion engine is already in operation). Then, the process proceeds to Step S7, and it is determined whether or not the vehicle speed VSP is equal to or greater than a first predetermined speed. If the determination of Step S7 is YES (vehicle speed VSP>first predetermined speed), the process proceeds to Step S8, the gear shift pattern of the multistage gear transmission 1 is set to "EV2nd ICE4th," and the program is ended.

If the determination of Step S7 is NO (vehicle speed VSP<first predetermined speed), then the process proceeds to Step S9, and it is determined whether or not the vehicle speed VSP is equal to or greater than a second predetermined speed that is slower than the first predetermined speed. If the determination of Step S9 is YES (vehicle speed VSP >second predetermined speed), then the process proceeds to Step S10, the gear shift pattern of the multistage gear transmission 1 is set to "EV2nd ICE2nd," and the program is ended. In contrast, if the determination of Step S9 is NO (vehicle speed VSP<second predetermined speed), then the process proceeds to Step S11, the vehicle is stopped, and the program is ended.

Figure 11:
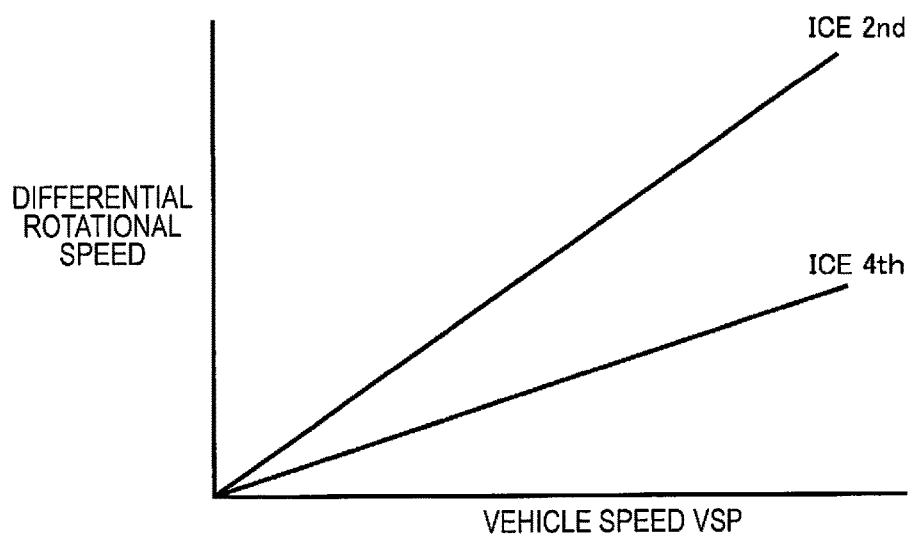
FIG. 11 is an explanatory view describing the relationship between the ICE gear shift stage and the differential rotational speed of the bearing portion, in a transmission mounted on a vehicle to which is applied the transmission control device of the embodiment.

Here, the selection of the ICE gear shift stages and the first and second predetermined speeds described above will be described with reference to FIGS. 11 and 12. FIG. 11 illustrates the relationship between the vehicle speed VSP and the differential rotational speed of the bearing portions (fourth and fifth bearing portions 214, 215) in the case where the "EV2nd ICE2nd" or the "EV2nd ICE4th" gear shift pattern is selected in the multistage gear transmission 1 of the embodiment. In addition, FIG. 12 illustrates the shifting map of the multistage gear transmission 1 of the embodiment, in a case where a malfunction has occurred in the electric oil pump 20.

As is clear from FIG. 11, the differential rotational speed of the fourth and fifth bearing portions 214, 215 becomes smaller when selecting ICE4th, compared to when selecting ICE2nd. That is, it can be seen that the required amount of lubrication oil is smaller when selecting ICE4th (that is, the load of the lubricated parts as a whole is small). Therefore, if a malfunction has occurred in the electric oil pump 20 for lubrication, then it is preferable to select ICE4th insofar as possible.

Figure 12:
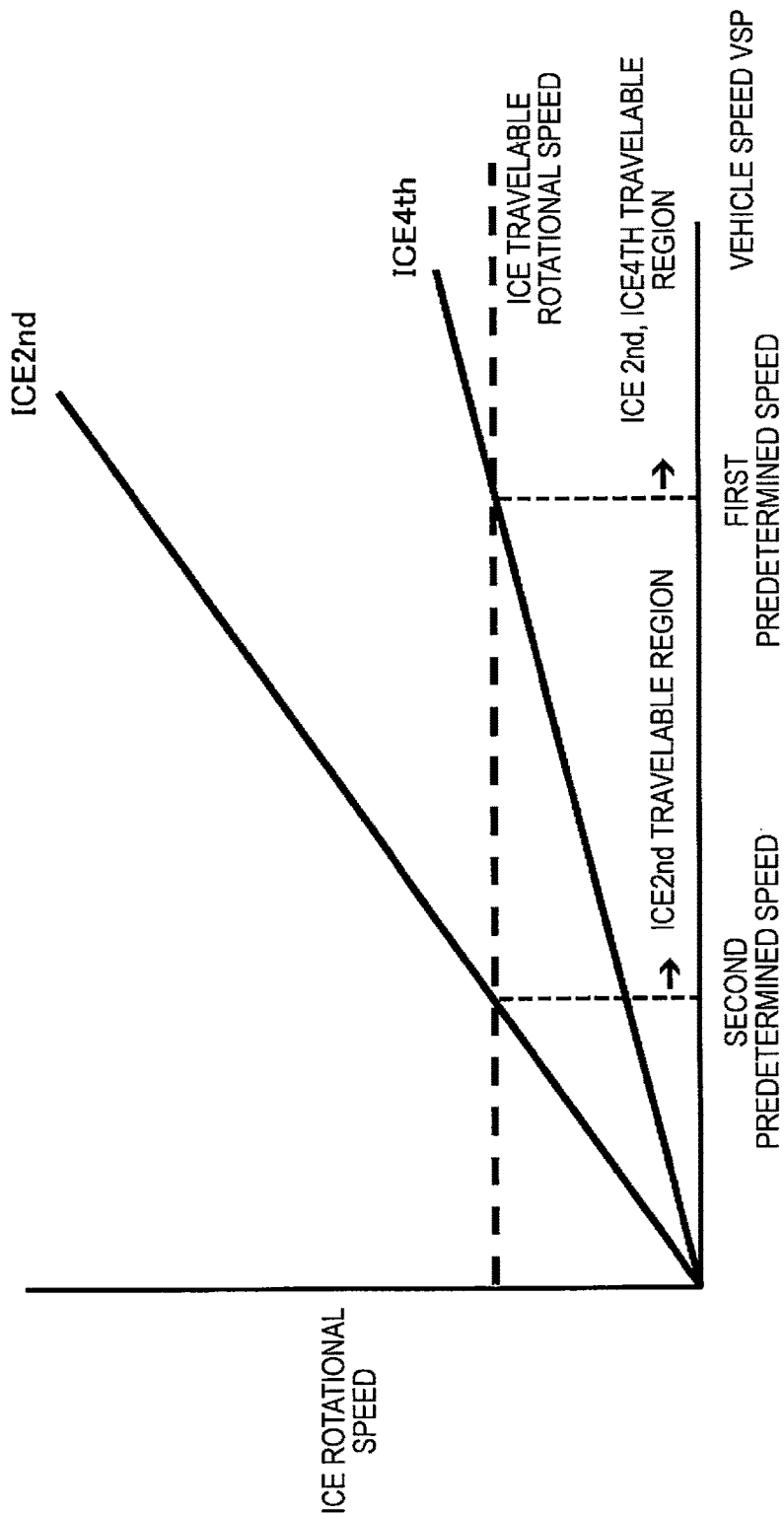
FIG. 12 is a schematic overview of a shifting map illustrating a concept of switching the ICE gear shift stage when a malfunction occurs in the lubricating oil pump, in a transmission mounted on a vehicle to which is applied the transmission control device of the embodiment.

On the other hand, if ICE4th is selected when the vehicle speed VSP is less than the first predetermined speed, then the rotational speed of the internal combustion engine ICE falls below the travelable rotational speed, as illustrated in FIG. 12. In other words, it is possible to select ICE4th as long as the vehicle speed VSP is equal to or greater than the first predetermined speed. In addition, if ICE2nd is selected when the vehicle speed VSP is less than the second predetermined speed, then the rotational speed of the internal combustion engine ICE falls below the travelable rotational speed. In other words, it is possible to select ICE2nd as long as the vehicle speed VSP is equal to or greater than the second predetermined speed.

Therefore, in the multistage gear transmission 1 of the present embodiment2, if the vehicle speed VSP is equal to or greater than the first predetermined speed, that is, if a plurality of gear shift stages (ICE2nd, ICE4th) can be selected as the ICE gear shift stage, ICE4th, in which the differential rotational speed of the bearing portions (the fourth and fifth bearing portions 214, 215) is small, is selected (Step S6→Step S7). Since the differential rotational speed of the fourth and fifth bearing portions 214, 215 is smaller when selecting EV2nd, as described above, EV2nd is selected as the EV gear shift stage (that is, the transmission control unit 23 selects the "EV2nd ICE4th" gear shift pattern).

In addition, in the multistage gear transmission 1 of the present embodiment, if the vehicle speed VSP is less than the first predetermined speed and equal to or greater than the second predetermined speed, ICE2nd is selected (Step S7→Step S9→Step S10). In such a case as well, EV2nd is selected as the EV gear shift stage (that is, the transmission control unit 23 selects the "EV2nd ICE2nd" gear shift pattern).

If the vehicle speed VSP is less than the second predetermined speed, then the rotational speed of the internal combustion engine ICE falls below the travelable rotational speed, regardless of whether ICE2nd or ICE4th is selected. Therefore, in such a case, the vehicle is promptly stopped.

Next, the actions are described. The "action of the shift control process," and the "characteristic action of the shift control" will be separately described, regarding the actions of the vehicle transmission control device according to the embodiment.

Action of the Shift Control Process

The action of the shift control process, in the case where a malfunction has occurred in the electric oil pump 20 for lubrication, will be described below, based on the flowchart illustrated in FIG. 5.

If a malfunction occurs in the electric oil pump 20 when the remaining battery SOC of the high-power battery 3 is equal to or greater than the threshold value, then the process proceeds from Step S1-Step S2→Step S3→Step S4→Step S5 in the flowchart of FIG. 5. That is, ICE1st, ICE3rd, and ICE3rd' are prohibited as the gear shift stage of the internal combustion engine ICE, the internal combustion engine ICE is stopped, and the vehicle travels in EV2nd (that is, the "EV2nd ICE-" gear shift pattern).

Thereafter, if the remaining battery SOC of the high-power battery 3 decreases and becomes less than the threshold value, then the process proceeds from Step S3→Step S6→Step S7, and ICE2nd or ICE4th is selected in accordance with the vehicle speed VSP (that is, the "EV2nd ICE2nd" or the "EV2nd ICE4th" gear shift pattern is selected). Additionally, if the vehicle speed VSP is less than the second predetermined speed, the vehicle is stopped (Step S11).

Figure 13:
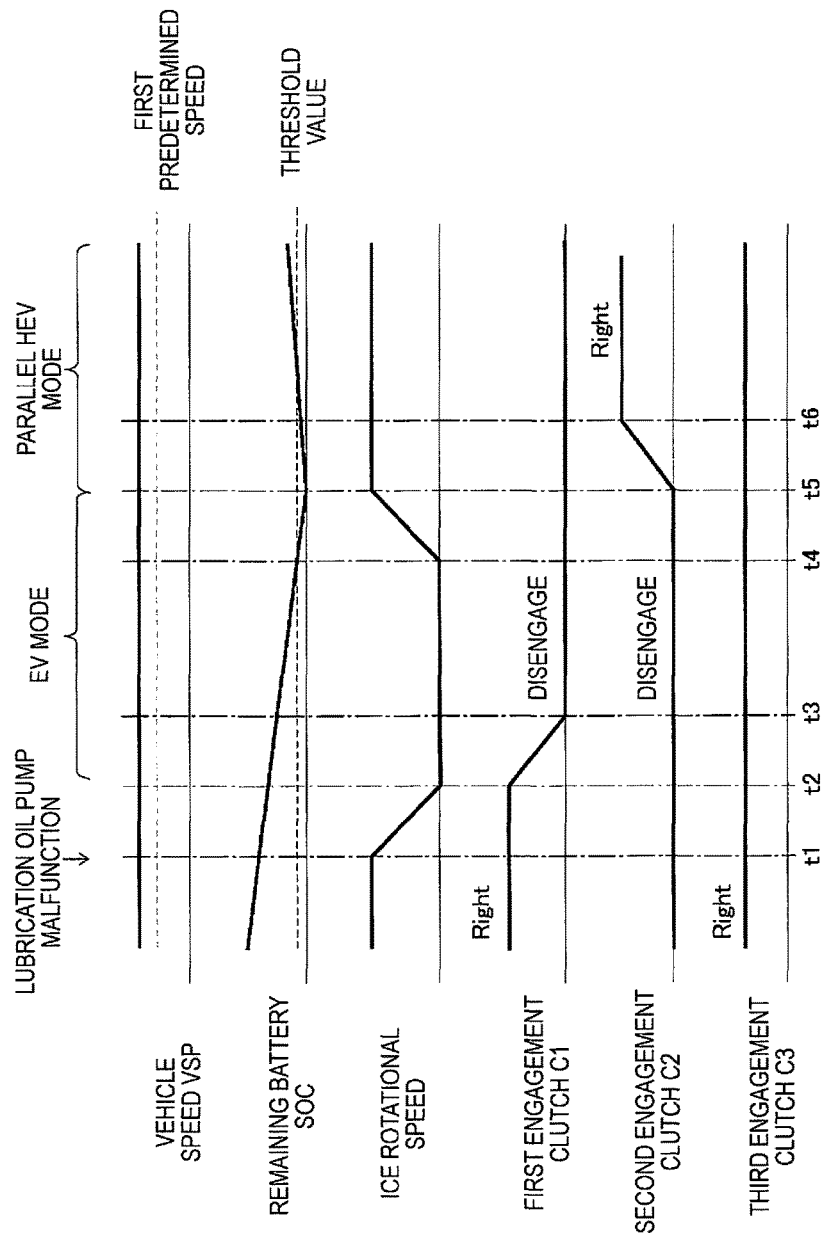
FIG. 13 is a time chart illustrating each characteristic at the time of executing the flowchart of FIG. 5.

The action of the shift control process described above will be described on the basis of the time chart of FIG. 13. The time chart of FIG. 13 assumes a state in which the vehicle is traveling with the "EV2nd ICE3rd" gear shift pattern.

If a malfunction occurs in the electric oil pump 20 at time t1 when the remaining battery SOC of the high-power battery 3 is equal to or greater than the threshold value, then the internal combustion engine ICE is stopped in order to travel in the "EV mode." When the ICE rotational speed of the internal combustion engine ICE becomes zero at time t2, the first engagement clutch C1 is released and the "EV2nd ICE-" gear shift pattern is selected (time t3).

Thereafter, when the remaining battery capacity of the high-power battery 3 decreases and becomes less than the threshold value, the internal combustion engine ICE is restarted (time t4). In the example illustrated in FIG. 13, since the vehicle speed VSP is equal to or greater than the first predetermined speed, the second engagement clutch is shifted from the "N" position to the "Right" position from time t5 to time t6, and the "EV2nd ICE4th" gear shift pattern is selected (that is, the vehicle is put in the "parallel HEV mode").

Characteristic Action of the Shift Control

As described above, in the present embodiment, a gear shift pattern (power transmission path) having a small load on the lubricated gears (101-105, etc.) and bearing portions (202, 203, 204, 205, etc.) is selected upon detecting a malfunction has occurred in the electric oil pump 20 for lubrication. That is, by selecting a power transmission path having a small load on the lubricated parts in the case of a lubrication failure, caused by malfunction of the electric oil pump 20, it is possible to prevent the lubricated parts from immediately seizing or being damaged.

In the embodiment upon detecting a malfunction has occurred in the electric oil pump 20, a path is selected in which the force that is applied in the radial direction of the bearing portions (the second to the fifth bearing portions 202-205) is small. As a result, in the case of a lubrication failure caused by malfunction of the electric oil pump 20, it is possible to prevent a large force from being applied in the radial direction of the bearing portions, which are differentially rotated, and to prevent the bearing portions (the second to the fifth bearing portions 202-205) from immediately seizing or being damaged.

In the embodiment upon detecting a malfunction has occurred in the electric oil pump 20, the use of a path by which the power that is transmitted from the internal combustion engine ICE passes through the second gear 102 (first power transmission gear), the twelfth gear 112 (second power transmission gear), the sixth gear 106 (third power transmission gear), and of a path by which the power that is transmitted from the internal combustion engine ICE passes through the fourth and fifth gears 104, 105 (fourth power transmission gear), the thirteenth gear 113 (fifth power transmission gear), and the ninth and tenth gears 109, 110 (sixth power transmission gear), is prohibited. That is, the selection of a gear shift pattern (power transmission path) that uses ICE1st, ICE3rd, and ICE3rd', whereby the ICE torque of the internal combustion engine ICE is transmitted so as to straddle the first shaft (first gear shaft) 11, is prohibited. As a result, in the case of a lubrication failure caused by malfunction of the electric oil pump 20, it is possible to prevent a large force from being applied in the radial direction of the bearing portions (second bearing portion 202, etc.), which are differentially rotated, and to prevent the second bearing portion 202, etc., from immediately seizing or being damaged.

In the embodiment upon detecting a malfunction has occurred in the electric oil pump 20, a path is selected in which the number of bearing portions that are differentially rotated is small (the second to the fifth bearing portions 202-205, the eleventh and the fourteenth to the sixteenth bearing portions 211, 214-216). Specifically, the EV mode is selected as long as the remaining battery SOC of the high-power battery 3 is equal to or greater than a threshold value. Therefore, it is possible to stop the rotation of rotary elements (the eleventh bearing portion 211, the fourteenth bearing portion 214, the fifteenth bearing portion 215, and the sixteenth bearing portion 216) that are differentially rotated due to the rotation of the internal combustion engine ICE. As a result, in the case of a lubrication failure caused by malfunction of the electric oil pump 20, it is possible to prevent the above-described rotary elements (the eleventh bearing portion 211, the fourteenth bearing portion 214, the fifteenth bearing portion 215, the sixteenth bearing portion 216, more specifically, of the above-described rotary elements, the fifteenth bearing portion 215 and the sixteenth bearing portion 216, to which lubrication oil is supplied by the electric oil pump 20) from immediately seizing or being damaged.

In the embodiment upon detecting a malfunction has occurred in the electric oil pump 20, a path in which only the electric motor is used as a drive source is selected. Therefore, it is possible to stop the rotation of rotary elements (the eleventh bearing portion 211, the fourteenth bearing portion 214, the fifteenth bearing portion 215, and the sixteenth bearing portion 216) that are differentially rotated due to the rotation of the internal combustion engine ICE. As a result, in the case of a lubrication failure caused by malfunction of the electric oil pump 20, it is possible to prevent the above-described rotary elements (the eleventh bearing portion 211, the fourteenth bearing portion 214, the fifteenth bearing portion 215, the sixteenth bearing portion 216, more specifically, of the above-described rotary elements, the fifteenth bearing portion 215 and the sixteenth bearing portion 216, to which lubrication oil is supplied by the electric oil pump 20) from immediately seizing or being damaged.

In the embodiment upon detecting a malfunction has occurred in the electric oil pump 20, a path is selected whereby traveling of the vehicle is possible, and the differential rotational speed of the bearing portions (the second and third bearing portions 202, 203, and the fourth and fifth bearing portions 204, 205) is small. That is, in terms of the EV gear shift stage, the differential rotational speed in the fourth and fifth bearing portions 204, 205 is smaller, and the required amount of lubrication oil is smaller, when in EV2nd than when in EV1st, as illustrated in FIG. 10. Therefore, EV2nd is selected as the EV gear shift stage. In addition, in terms of the ICE gear shift stage, the differential rotational speed in the second and third bearing portions 202, 203 is smaller, and the required amount of lubrication oil is smaller, when in ICE4th than when in ICE2nd, as illustrated in FIG. 11. Therefore, ICE4th is selected when the vehicle speed VSP is equal to or greater than the first predetermined speed, and both ICE2nd and ICE4th can be selected. As a result, in the case of a lubrication failure caused by malfunction of the electric oil pump 20, it is possible to prevent the second to the fifth bearing portions 202-205, from immediately seizing or being damaged.

Next, the effects are described. The effects listed below can be obtained by the vehicle transmission control device according to the embodiment.

(1) In a vehicle comprising a transmission (multistage gear transmission 1) having a gear-shifting mechanism (first shaft 11, second shaft 12, first gear 101, second gear 102, etc.) that obtains a plurality of gear shift stages (EV1st, EV2nd, ICE1st, ICE2nd, etc.) by selection of a plurality of power transmission paths (gear shift patterns), and an oil pump (electric oil pump 20) that supplies lubrication oil to lubricated parts (first to sixteenth gears 101-116, second to fifth bearing portions 202-205, etc.) of the gear-shifting mechanism, a transmission controller (transmission control unit 23) is provided for selecting the plurality of power transmission paths, and the transmission controller (transmission control unit 23) selects a path having a small load on the lubricated parts from among the plurality of power transmission paths (gear shift patterns) upon detecting a malfunction has occurred in the oil pump (electric oil pump 20) (steps S1-S8 in FIG. 5). It is thereby possible to prevent the lubricated parts from immediately seizing or being damaged, by selecting a power transmission path having a small load on the lubricated parts in the case of a lubrication failure, caused by malfunction of the electric oil pump 20.

(2) The lubricated parts comprise at least bearing portions (second to fifth bearing portions 202-205, etc.), and the transmission controller (transmission control unit 23) selects a path in which a force that is applied in a radial direction of the bearing portions (second to fifth bearing portions 202-205, etc.) is small, from among the plurality of power transmission paths (gear shift patterns) upon detecting a malfunction has occurred in the oil pump (electric oil pump 20) (Step S2 in FIG. 5). As a result, in the case of a lubrication failure caused by malfunction of the electric oil pump 20, it is possible to prevent a large force from being applied in the radial direction of the bearing portions (second to fifth bearing portions 202-205), which are differentially rotated, and to prevent the bearing portions (second to fifth bearing portions 202-205) from immediately seizing or being damaged.

(3) The vehicle comprises an internal combustion engine ICE as a power source, the gear-shifting mechanism comprises a first gear shaft (first shaft 11), a first power transmission gear (second gear 102) that is provided to the first gear shaft (first shaft 11), a second power transmission gear (twelfth gear 112) and a third power transmission gear (sixth gear 106) that mesh with the first power transmission gear (second gear 102), a hollow second gear shaft (second shaft 12), inside of which the first gear shaft (first shaft 11) is interposed, a fourth power transmission gear (fourth gear 104, fifth gear 105) that is provided to the second gear shaft (second shaft 12), and a fifth power transmission gear (thirteenth gear 113) and a sixth power transmission gear (ninth gear 109, tenth gear 110) that mesh with the fourth power transmission gear (fourth gear 104, fifth gear 105), and upon detecting the malfunction has occurred in the oil pump (electric oil pump 20), the transmission controller (transmission control unit 23) prohibits use of a path from among the plurality of transmission paths (gear shift patterns) by which the power (ICE torque) that is transmitted from the internal combustion engine ICE passes through the first, second, and third power transmission gears (that is, a path by which the ICE torque is transmitted from the twelfth gear 112→the second gear 102→the sixth gear 106), and prohibits use of a path by which the power that is transmitted from the internal combustion engine ICE passes through the fourth, fifth, and sixth power transmission gears (that is, a path by which the ICE torque is transmitted from the thirteenth gear 113→the fourth gear 104→the ninth gear 109, or a path by which the ICE torque is transmitted from the thirteenth gear 113→the fourth gear 104→the fifth gear 105→the tenth gear 110) (Step S2 in FIG. 5). As a result, in the case of a lubrication failure caused by malfunction of the electric oil pump 20, it is possible to prevent a large force from being applied in the radial direction of the bearing portions (second to fifth bearing portions 202-205), which are differentially rotated, and to prevent the second to the fifth bearing portions 202-205 from immediately seizing or being damaged.

(4) The lubricated parts comprise at least a plurality of bearing portions (second to fifth bearing portions 202-205, eleventh, fourteenth, fifteenth, and sixteenth bearing portions 211, 214, 215, 216), and the transmission controller (transmission control unit 23) selects a path in which the number of the bearing portions that are differentially rotated is small, from among the plurality of power transmission paths (gear shift patterns) upon detecting a malfunction has occurred in the oil pump (electric oil pump 20) (steps S4 and S5 in FIG. 5). As a result, in the case of a lubrication failure caused by malfunction of the electric oil pump 20, it is possible to prevent the fifteenth bearing portion 215 and the sixteenth bearing portion 216, to which lubrication oil is supplied from the electric oil pump 20, from being differentially rotated; therefore, it is possible to prevent these bearing portions from immediately seizing or being damaged.

(5) The vehicle is a hybrid vehicle comprising an electric motor (first motor/generator MG1) and an internal combustion engine ICE as power sources, wherein the transmission controller (transmission control unit 23) selects a path whereby only the electric motor (first motor/generator MG1) is used as a drive source from among the plurality of power transmission paths (gear shift patterns) upon detecting a malfunction has occurred in the oil pump (electric oil pump 20) (steps S4 and S5 in FIG. 5). As a result, in the case of a lubrication failure caused by a malfunction of the electric oil pump 20, it is possible to prevent the elements that are differentially rotated (more precisely, of the elements that are differentially rotated, the fifteenth bearing portion 215 and the sixteenth bearing portion 216, to which lubrication oil is supplied from the electric oil pump 20) from immediately seizing or being damaged.

(6) The lubricated parts comprise at least bearing portions (fourth and fifth bearing portions 204, 205), and upon detecting a malfunction has occurred in the oil pump (electric oil pump 20), the transmission controller (transmission control unit 23) selects a path from among the plurality of power transmission paths (gear shift patterns) (Step S5, Step S7-Step S10 in FIG. 5) whereby traveling of the vehicle is possible, and the differential rotational speed of the bearing portions (fourth and fifth bearing portions 204, 205) is small. As a result, in the case of a lubrication failure caused by malfunction of the electric oil pump 20, it is possible to prevent the second to the fifth bearing portions 202-205, from immediately seizing or being damaged.

(7) In a vehicle comprising an oil pump (electric oil pump 20) that supplies lubrication oil to lubricated parts (first to sixteenth gears 101-116, second to fifth bearing portions 202-205, etc.) of a gear-shifting mechanism having a plurality of power transmission paths (gear shift patterns), detecting a malfunction in the oil pump (Step S1 in FIG. 5), and selecting a path having a small load on the lubricated parts from among the plurality of power transmission paths upon detecting the malfunction in the oil pump (Steps S1-S8 of FIG. 5). It is thereby possible to prevent the lubricated parts from immediately seizing or being damaged, by selecting a power transmission path having a small load on the lubricated parts in the case of a lubrication failure, caused by a malfunction of the electric oil pump 20.

The vehicle transmission control device of the present invention was described above based on the embodiment, but specific configurations thereof are not limited to this embodiment, and various modifications and additions to the design can be made without departing from the scope of the invention according to each of the Claims.

In the embodiment, an example was shown in which the transmission control device of the present invention is applied to hybrid vehicle. However, the transmission control device of the present invention may be applied to any vehicle using a transmission having a gear-shifting mechanism, and may be applied to a vehicle having only an internal combustion engine as a drive source.

In the embodiment, an example was shown in which is applied a multistage gear transmission 1 comprising EV first to second speeds as EV gear shift stages, and ICE first to fourth speeds as ICE gear shift stages. However, the transmission control device of the present invention can be applied to any transmission having a gear-shifting mechanism that obtains a plurality of gear shift stages by selecting a plurality of power transmission paths, and the configuration of the multistage gear transmission is not limited to the embodiment. s selected when a malfunction occurs in the electric oil pump (20).

The invention claimed is:

1. A vehicle transmission control device for a vehicle comprising
    an internal combustion engine as a power source,
    a transmission having a gear-shifting mechanism that obtains a plurality of gear shift stages by selecting a plurality of power transmission paths, the gear-shifting mechanism comprising a first gear shaft connected to the internal combustion engine, a first power transmission gear that is a planet gear arranged to be connectable to the first gear shaft via an engagement clutch, a second power transmission gear arranged to mesh with the first power transmission gear, a third power transmission gear that is provided on a shaft arranged on an output side of the transmission, a hollow second gear shaft arranged enclosing the first gear shaft, a fourth power transmission gear that is provided on the second gear shaft, a fifth power transmission gear arranged to mesh with the fourth power transmission gear, and a sixth power transmission gear provided on the shaft arranged on the output side of the transmission, and
    an oil pump that supplies lubrication oil to lubricated parts of the gear-shifting mechanism,
    the vehicle transmission control device comprising:
    a transmission controller that is configured to select the plurality of power transmission paths, and
    the transmission controller being further configured such that upon detecting a malfunction has occurred in the oil pump, the transmission controller
    prohibits use of a path among the plurality of power transmission paths in which the engagement clutch is in a neutral position and the power transmitted from the internal combustion engine passes through the first, second, and third power transmission gears, and prohibits use of a path among the plurality of power transmission paths in which the engagement clutch is in a neutral position and the power transmitted from the internal combustion engine passes through the fourth, fifth, and sixth power transmission gears, and
    selects, from among the plurality of power transmission paths, a path in which the engagement clutch is in an engagement position and the power transmitted from the internal combustion engine passes through the first and third power transmission gears.

2. The vehicle transmission control device according to claim 1, wherein
    the vehicle is a hybrid vehicle comprising an electric motor and an internal combustion engine as power sources, and
    the transmission controller selects, from among the plurality of power transmission paths, a path in which the power passes through the first and third power transmission gears upon detecting the malfunction has occurred when a state of charge of a battery provided as a power source for the electric motor is smaller than a threshold value, or selects a path in which only the electric motor is used as a drive source upon detecting the malfunction has occurred in the oil pump when the state of charge of the battery is equal to or larger than the threshold value.

3. The vehicle transmission control device according to claim 1, wherein
the lubricated parts comprise at least bearing portions, and
the transmission controller selects, among the paths in which the power transmitted from the internal combustion engine passes through the first and third power transmission gears, a path whereby traveling of the vehicle is possible, and the differential rotational speed of the bearing portions is smallest upon detecting the malfunction has occurred in the oil pump.

4. A vehicle transmission control method for a vehicle comprising
an internal combustion engine as a power source,
a transmission having a gear-shifting mechanism that obtains a plurality of gear shift stages by selecting a plurality of power transmission paths, the gear-shifting mechanism comprising a first gear shaft connected to the internal combustion engine, a first power transmission gear that is a planet gear arranged to be connectable to the first gear shaft via an engagement clutch, a second power transmission gear arranged to mesh with the first power transmission gear, a third power transmission gear that is provided on a shaft arranged on an output side of the transmission, a hollow second gear shaft arranged enclosing the first gear shaft, a fourth power transmission gear that is provided on the second gear shaft, a fifth power transmission gear arranged to mesh with the fourth power transmission gear, and a sixth power transmission gear provided on the shaft arranged on the output side of the transmission, and
an oil pump that supplies lubrication oil to lubricated parts of a gear-shifting mechanism having a plurality of power transmission paths,
the method comprising:
detecting whether there is a malfunction in the oil pump, and upon detecting the malfunction in the oil pump,
prohibiting use of a path among the plurality of power transmission paths in which the engagement clutch is in a neutral position and the power transmitted from the internal combustion engine passes through the first, second, and third power transmission gears,
prohibiting use of a path in which the engagement clutch is in a neutral position and the power transmitted from the internal combustion engine passes through the fourth, fifth, and sixth power transmission gears, and
selecting, from among the plurality of power transmission paths, a path in which the engagement clutch is in an engagement position and the power transmitted from the internal combustion engine passes through the first and third power transmission gears.

5. The vehicle transmission control method according to claim 4, wherein
the vehicle is a hybrid vehicle comprising an electric motor and an internal combustion engine as power sources, and
the method further includes selecting, from among the plurality of power transmission paths, a path in which the power passes through the first and third power transmission gears upon detecting the malfunction has occurred when a state of charge of a battery provided as a power source for the electric motor is smaller than a threshold value, or selecting a path in which only the electric motor is used as a drive source upon detecting the malfunction has occurred in the oil pump when the state of charge of the battery is equal to or larger than the threshold value.

6. The vehicle transmission control method according to claim 4, wherein
the lubricated parts comprise at least bearing portions, and
the method further includes selecting, among the paths in which the power transmitted from the internal combustion engine passes through the first and third power transmission gears, a path whereby traveling of the vehicle is possible, and the differential rotational speed of the bearing portions is smallest upon detecting the malfunction has occurred in the oil pump.

* * * * *